No. 770,428. PATENTED SEPT. 20, 1904.
E. J. GRIFFITHS.
HEAT AND SMUDGE COMPOSITION.
APPLICATION FILED SEPT. 21, 1903.
NO MODEL.
Fig. I
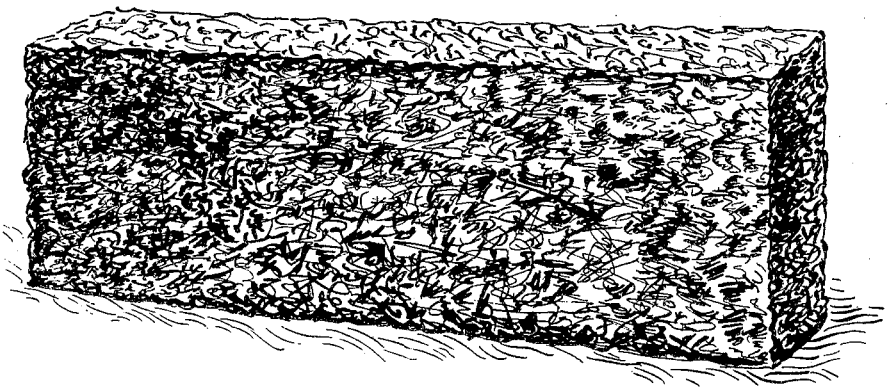
Fig. II
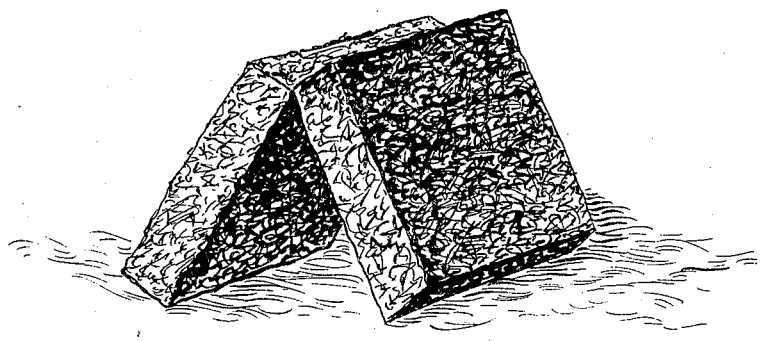
Witnesses
Inventor
Edward J. Griffiths
by Townsend Bros
his attys.

No. 770,428.	Patented September 20, 1904.

UNITED STATES PATENT OFFICE.

EDWARD J. GRIFFITHS, OF LOS ANGELES, CALIFORNIA, ASSIGNOR TO GEORGE GRIFFITHS, OF LOS ANGELES, CALIFORNIA.

HEAT AND SMUDGE COMPOSITION.

SPECIFICATION forming part of Letters Patent No. 770,428, dated September 20, 1904.

Application filed September 21, 1903. Serial No. 174,022. (No specimens.)

*To all whom it may concern:*

Be it known that I, EDWARD J. GRIFFITHS, a citizen of the United States, residing in Los Angeles, in the county of Los Angeles and State of California, have invented a new and useful Heat and Smudge Composition, of which the following is a specification.

This invention relates to a composition designed to be burned in orchards, gardens, vineyards, or other places to produce heat and a smudge for preventing damage from frosts.

One object of the invention is to provide a composition which when burned will produce great heat and a dense smoke.

Compositions for this purpose have heretofore been employed, but which when burned smothered themselves out by reason of the melting and flowing of the composition which packed and caked and smothered the fire; and an important object of the present invention is to provide a composition which will not run when burned, but which will maintain its form and not cake and smother, but which as it burns "cokes" in a manner similar to bituminous coal.

Another object is to provide a composition which when burned will produce a smudge containing an agent which will destroy insects and scale on the trees.

Another important object is to provide a composition of the character described which while producing the beneficial results set forth will leave no deposit of soot upon the trees or plants.

Another object is to provide a composition which will burn, although it has received a wetting either from rain or dew.

Another object is to provide a composition of the character described which may be constructed of inexpensive materials which are easily obtained and readily manipulated into the desired form.

The accompanying drawings illustrate the invention.

Referring to the drawings, Figure I is a perspective of the composition in the form of a briquet. Fig. II shows an arrangement of briquets ready for ignition.

The composition comprises a mixture formed of crude petroleum, a divided solid material—such as coal-dust or fine screenings and the like, and sawdust, shavings, or other like material and asphaltum containing a certain amount of sulfur, preferably in the form of sulfuric acid. These materials and proportions may be varied somewhat; but I have found the following to give good results, viz: sawdust and shavings, thirty-three per cent.; asphaltum and sulfur, twenty per cent.; coal-dust, twenty-three per cent.; crude petroleum, twenty-four per cent.

I prefer to utilize the sludge which is a waste product produced by oil-refineries, which consists of asphaltum containing an amount of sulfuric acid. This sludge is approximately from two per cent. to twenty-five per cent. sulfuric acid, which acid was added to the crude asphaltum-oil to facilitate the purification of the oil. The use of a sufficient percentage of added sulfur or sulfuric acid causes the composition to coke when burning, so that the fire is not smothered and will not "go out," as has been the tendency with other compositions heretofore used for this purpose. With the added sulfur or sulfuric acid the briquets will burn slowly until the briquets are entirely consumed. The smoke and heated fumes therefrom hang heavily over the orchard and effectually ward off frost. The passage of such heated fumes through the trees and foliage fumigates the same, and the beneficial effect may be readily noted by the brightened foliage. If desired, asphaltum may be used in place of the sludge, in which case sulfur or sulfuric acid to the amount of at least two per cent. must be added to the asphalt to insure the coking of the briquet.

In preparing the composition the shavings and sawdust are stirred into the heated crude petroleum. The coal-screenings are also stirred into the mixture, and then the sludge may be added. These elements are thoroughly mixed and then pressed into the form desired. The composition is readily ignited and burns freely, generating an intense heat, and produces a thick smoke, which rises and hangs over the orchard like a blanket, which retains the heat and prevents frost. The sulfur in the smoke destroys insects and removes scale on the trees. When the composition is made of the best proportions, a yellowish tint is observed near the root of the flames, which denotes the presence of sufficient sulfur. The sludge acts as a binder of the materials, and when the composition burns it causes the composition to coke in a manner similar to bituminous coal, so that the fire is not smothered, and the briquet burns freely until consumed to a crisp mass, which falls into ashes when disturbed.

Having described my invention, what I claim, and desire to secure by Letters Patent of the United States, is—

1. An orchard-smudge composition comprising crude petroleum, a divided solid material, an asphaltum impregnated with sulfur.

2. An orchard-smudge composition comprising crude petroleum, sawdust or shavings, coal-screenings, and asphaltum containing sulfuric acid.

In testimony whereof I have hereunto signed my name, in the presence of two subscribing witnesses, at Los Angeles, in the county of Los Angeles and State of California, this 9th day of September, 1903.

EDWARD J. GRIFFITHS.

Witnesses:
GEORGE T. HACKLEY,
F. M. TOWNSEND.